(12) United States Patent  
Gatta et al.

(10) Patent No.: US 9,008,248 B2  
(45) Date of Patent: Apr. 14, 2015

(54) VARIABLE LOW IF RECEIVER FOR MULTI-CHANNEL APPLICATIONS

(75) Inventors: Francesco Gatta, Laguna Niguel, CA (US); Ramon Gomez, San Juan Cap, CA (US); Leonard Dauphinee, Costa Mesa, CA (US); Young Joon Shin, Irvine, CA (US); Hanli Zou, Rancho Santa Margarita, CA (US); Massimo Brandolini, Laguna Niguel, CA (US); Giuseppe Cusmai, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1113 days.

(21) Appl. No.: 12/553,687

(22) Filed: Sep. 3, 2009

(65) Prior Publication Data

US 2010/0067630 A1    Mar. 18, 2010

Related U.S. Application Data

(60) Provisional application No. 61/136,609, filed on Sep. 18, 2008, provisional application No. 61/136,608, filed on Sep. 18, 2008, provisional application No. 61/230,509, filed on Jul. 31, 2009.

(51) Int. Cl.
| | |
|---|---|
| H04B 1/10 | (2006.01) |
| H04N 5/455 | (2006.01) |
| H04N 21/426 | (2011.01) |
| H04N 21/438 | (2011.01) |
| H04N 5/45 | (2011.01) |

(52) U.S. Cl.  
CPC ............ *H04N 5/455* (2013.01); *H04N 21/4263* (2013.01); *H04N 21/4382* (2013.01); *H04N 5/45* (2013.01)

(58) Field of Classification Search  
USPC .......................................................... 375/350  
See application file for complete search history.

(56) References Cited

U.S. PATENT DOCUMENTS

| | | | |
|---|---|---|---|
| 6,754,508 B1 | 6/2004 | Pau | |
| 7,006,162 B2 | 2/2006 | Cowley et al. | |
| 7,031,686 B2 | 4/2006 | Kim et al. | |
| 2003/0227575 A1* | 12/2003 | Plonka | 348/731 |
| 2004/0087279 A1* | 5/2004 | Muschallik et al. | 455/73 |
| 2008/0100753 A1* | 5/2008 | Wang et al. | 348/731 |
| 2008/0187038 A1* | 8/2008 | Currivan et al. | 375/233 |
| 2008/0318534 A1* | 12/2008 | Mak et al. | 455/91 |
| 2010/0066917 A1 | 3/2010 | Gatta et al. | |

* cited by examiner

*Primary Examiner* — Tanmay Shah  
(74) *Attorney, Agent, or Firm* — Sterne, Kess;er, Goldstein & Fox P.L.L.C.

(57) ABSTRACT

Systems and methods for demodulating a plurality of contiguous channels contained within a bandlimited portion of a radio-frequency (RF) input signal are provided. In an embodiment, the bandlimited portion of the RF input signal is down-converted to baseband. After down-conversion, the bandlimited portion overlaps at baseband with a mirror image of the bandlimited portion. The plurality of contiguous channels within the down-converted signal similarly overlap at baseband and subsequently occupy a bandwidth substantially equal to half that required before down-converting. Image rejection is performed in the digital domain to recover each of the plurality of overlapping channels.

30 Claims, 8 Drawing Sheets

VARIABLE LOW IF RECEIVER FOR MULTI-CHANNEL APPLICATIONS

CROSS REFERENCE TO RELATED APPLICATIONS

The present application claims the benefit of U.S. Provisional Patent Application No. 61/136,609, filed Sep. 18, 2008, entitled "Variable Low IF Receiver for Multi-Channel Applications," U.S. Provisional Patent Application No. 61/136,608, filed Sep. 18, 2008, entitled "A Dual Tuner Having a Variable Low-IF," and U.S. Provisional Patent Application No. 61/230,509, filed Jul. 31, 2009, entitled "Variable Low IF Receiver for Multi-Channel Applications," all of which are herein incorporated by reference in their entirety.

FIELD OF THE INVENTION

This application relates generally to receivers for multi-channel applications and, in particular to variable low inter-mediate-frequency (IF) receiver configurations for multi-channel applications.

BACKGROUND

Radio receivers, or tuners, are widely used in applications requiring the reception of electromagnetic energy. Applications can include broadcast receivers such as radio and television, set top boxes for cable television, cable modems, receivers in local area networks, test and measurement equipment, radar receivers, air traffic control receivers, and microwave communication links among others. Transmission of the electromagnetic energy may be over a transmission line or by electromagnetic waves.

Many applications require a receiver that can tune to multiple channels at the same time. For example, Picture in Picture (PiP) is a feature that is enabled by some television receivers and set top boxes. The PiP feature allows for one program to be fully displayed on a television screen, while one or more additional programs are displayed in inset windows at the same time.

Similarly, the Data Over Cable System Interface Specification (DOCSIS) 3.0 requires compliant cable modem receivers to have the ability to tune to multiple downstream channels at the same time. The term DOCSIS generally refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The most current version of the DOCSIS specification is DOCSIS 3.0.

In order to stay competitive with providers offering telecommunications services over fiber, and to better support bandwidth intensive applications, such as video-over-IP, DOCSIS 3.0 provides for a new feature referred to as channel bonding. This new feature calls for the bonding of any four channels in a contiguous 64 MHz bandwidth centered anywhere between 54 MHz and 1 GHz. In downstream transmissions, from a cable headend to a cable modem located at a subscriber premise, each downstream channel occupies a separate 6 MHz or 8 MHz frequency band and is capable of carrying a payload of approximately 38 Mbps (50 Mbps in Euro DOCSIS compliant systems). Channel bonding allows for a load to be distributed among multiple RF channels, allowing for a maximum throughput of n*38 Mbps (with n being the number of bonded channels).

Traditional cable modem receivers utilize a dual-conversion tuner architecture that is capable of down-converting a single channel. This dual conversion architecture typically utilizes two complex mixers and a surface acoustic wave (SAW) filter. The SAW filter is a mechanically resonant device that is typically fabricated on a ceramic substrate, and therefore cannot be integrated on-chip with the other tuner components. As such, the SAW filter remains a discrete component in many tuner designs, preventing the tuners from being fabricated on a single silicon substrate.

A simple approach to comply with the channel bonding standard specified in DOCSIS 3.0 is to use four instances of the traditional single channel tuner. Although this implementation can provide for the greatest flexibility in selecting multiple, non-contiguous channels in the downstream bandwidth, this solution requires a high component count, including four separate SAW filters, and a large amount of area in an IC implementation.

Alternatively, a single tuner architecture can be used that can down-convert four or more RF channels within any 64 MHz bandwidth. A single tuner architecture can provide for reductions in power consumption and silicon area. However, conventional implementations of this architecture typically require a SAW filter, as well as a large analog-to-digital converter (ADC) capable of handling bandwidths up to and in excess of 64 MHz.

Therefore, what is needed is new receiver and tuner architectures that provide flexibility in the selection and down-conversion of multiple RF channels, while at the same time eliminating the need for expensive, area-consuming components, such as SAW filters and high-bandwidth ADCs.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. Exemplary Operating Environment

Figure 1:
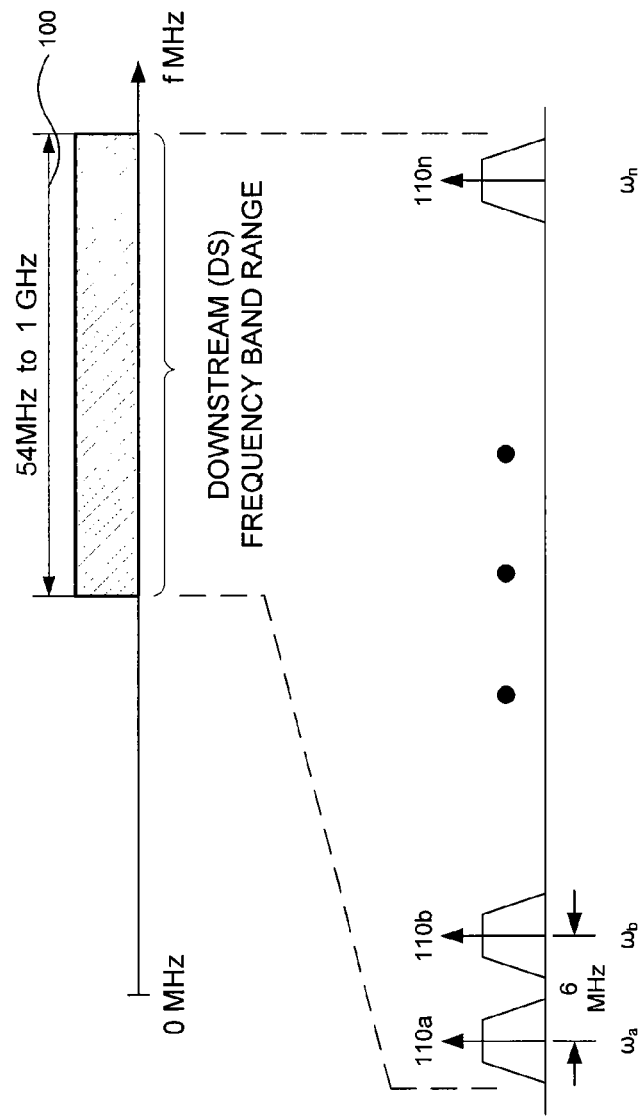
FIG. 1 illustrates an exemplary embodiment of a downstream transmission frequency band for use in a DOCSIS compliant network.

FIG. 1 is an illustration of the radio frequency (RF) spectrum allocated for downstream transmission in accordance with DOCSIS 3.0. Frequency band 100 spans the spectrum from 54 MHz to 1 GHz. Downstream communication, from a cable headend to a cable modem at a customer premise, is transmitted within frequency band 100. In general, transmission over a medium can occur at any frequency range that is suitable for transmission for that particular medium. Frequency band 100 merely represents one possible frequency range and is used herein for exemplary purposes.

As further illustrated by FIG. 1, frequency band 100 has been subdivided into a number of channels 110a-n. A channel 110 is a convenient way to refer to a range of frequencies allocated to a single broadcast. Each channel 110 for downstream transmission has an allocated fixed bandwidth of 6 MHz or 8 MHz as specified by DOCSIS 3.0. FIG. 1 illustrates exemplary channel bandwidths of 6 MHz, where the carriers of successive channels 110a-n have a fixed position relative to each other at or near 6 MHz.

The frequency spectra of each channel 110 has been shifted to non-overlapping portions of the 54 MHz to 1 GHz range through modulation. In carrier modulation, one or more of the fundamental parameters (e.g., amplitude, frequency, or phase) of a sinusoidal carrier having a particular frequency is varied proportional to a baseband signal. For example, the baseband signal of channel 110a has been modulated onto a carrier of frequency $\omega_a$. The baseband signal of channel 110b has similarly been modulated onto a carrier; however, the carrier in the instance of channel 110b has a frequency $\omega_b$ that is at or near 6 MHz above frequency $\omega_a$. By modulating the baseband signals for channels 110a-n and shifting their spectra to non-overlapping bands, the entire 54 MHz to 1 GHz allocated frequency band 100 can be utilized. This type of utilization is commonly referred to as frequency division multiplexing (FDM).

Figure 2:
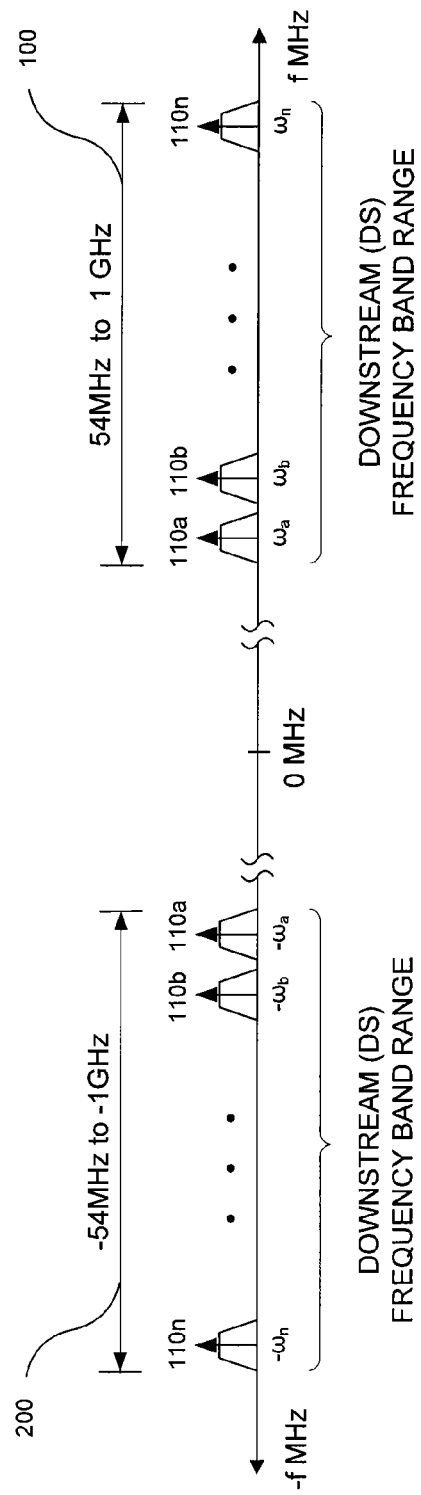
FIG. 2 illustrates a well known property of carrier modulation as applied to the downstream transmission frequency band of FIG. 1.

FIG. 2 is an illustration of a well known property of carrier modulation. The process of carrier modulation shifts the spectrum of the modulating signal to the left and right in the frequency domain by the carrier frequency. As a result, in modulating respective baseband signals for channels 110a-n, each channels' spectrum is shifted to the left and right by the frequency of the carrier. For example, the spectrum of channel 110a has been shifted to a frequency $\omega_a$ and a frequency $-\omega_a$. Similarly, the spectrum of channel 110b has been shifted to a frequency $\omega_b$ and a frequency $-\omega_b$. In general, frequency band 200 is a mirror image of frequency band 100 across the vertical axis at zero MHz and contains identical information. That is, the information contained in channels 110a-n can be fully recovered from either frequency band 100 or 200.

As noted above, certain frequency bands, such as frequency band 100, are subdivided into multiple channels 110a-n. In typical applications, receivers are configured with a single tuner able to select and demodulate any one of a plurality of channels within a particular frequency band. However, in certain applications the information contained in multiple channels at any given point in time may be desired. The DOCSIS 3.0 standard, and in general DOCSIS 3.0 compliant receivers, present one exemplary application where information contained in multiple channels at any given point in time may be desired.

In order to stay competitive with providers offering telecommunications services over fiber, and to better support bandwidth intensive applications, such as video-over-IP, DOCSIS 3.0 provides for a new feature referred to as channel bonding. This new feature calls for the bonding of any four channels in a contiguous 64 MHz bandwidth centered anywhere between the 54 MHz and 1 GHz downstream frequency band 100. Channel bonding allows for a load to be distributed among multiple channels 110a-n, allowing for a maximum throughput of n*38 Mbps (with n being the number of bonded channels).

2. Receiver for Multi-Channel Applications

Figure 3:
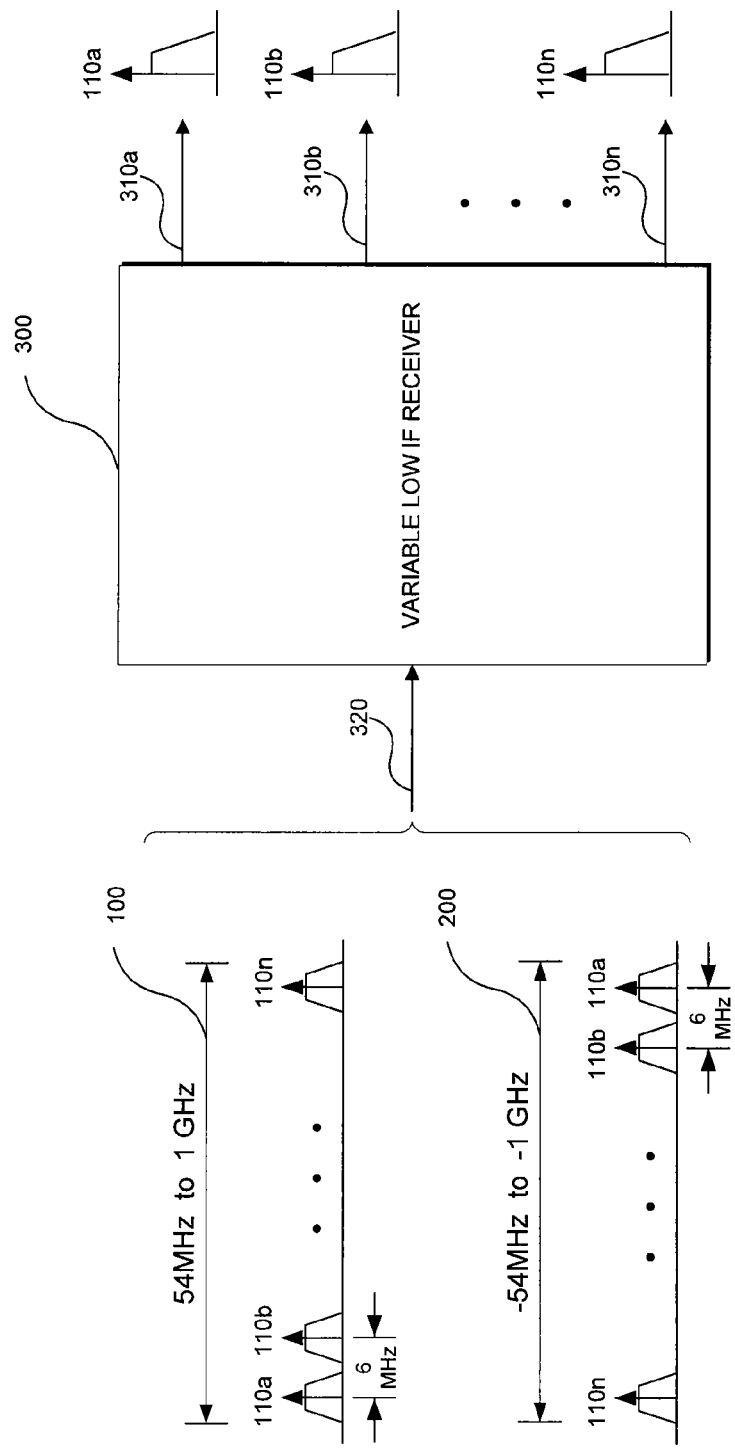
FIG. 3 illustrates an exemplary variable low intermediate-frequency (IF) receiver, according to an embodiment of the present invention.

FIG. 3 illustrates a variable low intermediate-frequency (IF) receiver 300, according to an embodiment of the present invention. Variable low IF receiver 300 is capable of demodulating a plurality of channels at any given point in time. As shown in FIG. 3, variable low IF receiver 300 receives downstream frequency band 100 and mirror image frequency band 200 at input 320. Variable low IF receiver 300 can be configured to demodulate any number of downstream channels 110 contained within downstream frequency bands 100 and 200. Each demodulated channel 110a-n is provided at baseband by outputs 310a-n. Variable low IF receiver 300 can be used in DOCSIS 3.0 channel bonding applications in which a load has been distributed among multiple channels 110. However, variable low IF receiver 300 can be used in other applications requiring the reception and demodulation of multiple RF channels and is in no way limited to use in DOCSIS 3.0 channel bonding applications.

A key feature of variable low IF receiver 300 is the use of mirror image frequency band 200 in conjunction with frequency band 100 to demodulate multiple channels in an efficient manner. This and other advantageous features of variable low IF receiver 300 will become apparent from the following discussion.

Figure 4:
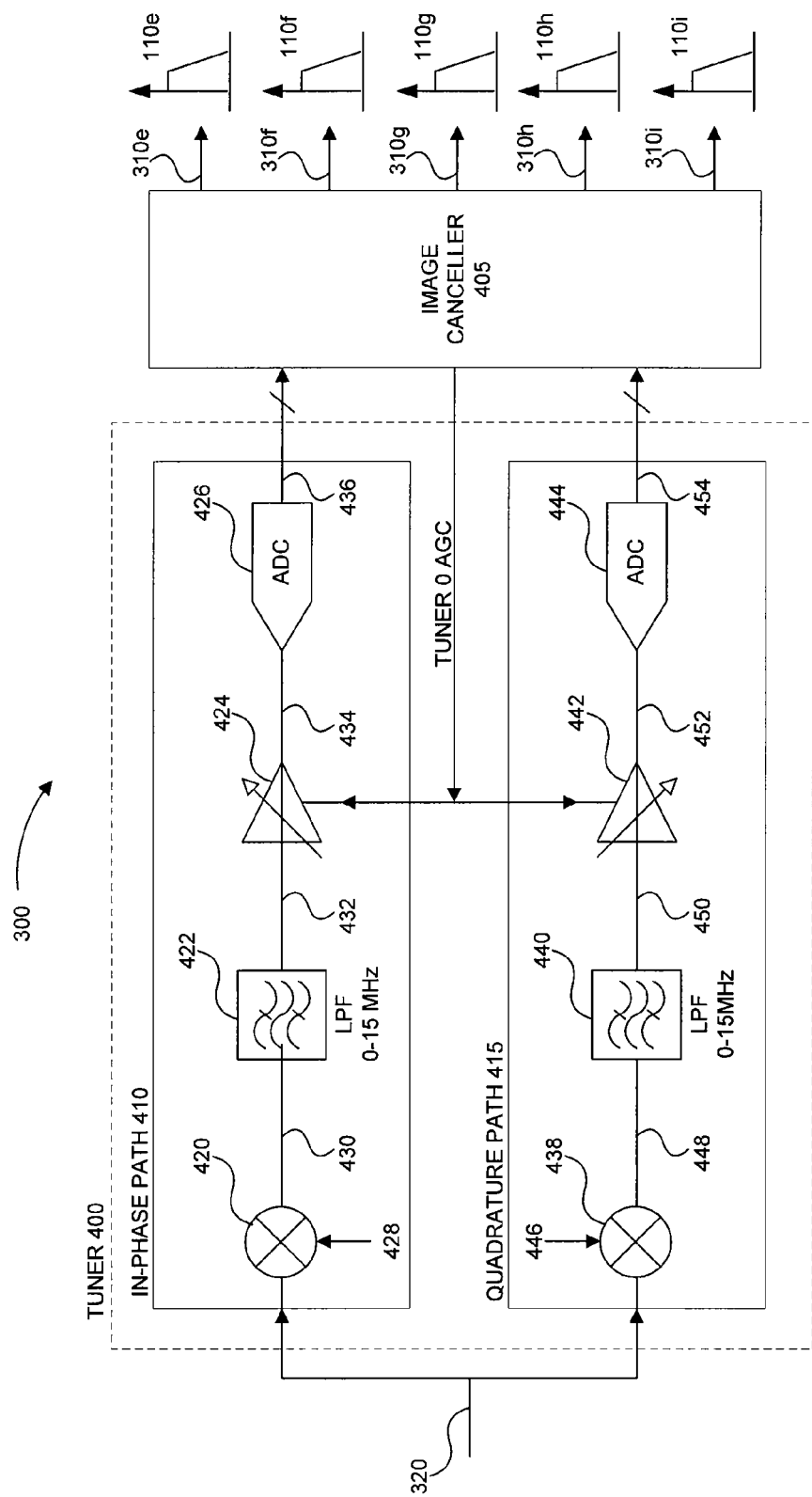
FIG. 4 illustrates an exemplary variable low IF receiver capable of down-converting five contiguous channels within a received multi-channel radio-frequency (RF) input signal, according to an embodiment of the present invention.

FIG. 4 illustrates an exemplary configuration for variable low IF receiver 300, according to an embodiment of the present invention. Variable low IF receiver 300 includes a tuner 400 and an image canceller 405. In the exemplary embodiment of FIG. 4, tuner 400 and image canceller 405 receive and process frequency bands 100 and 200 received at input 320 to simultaneously demodulate up to five contiguous channels within frequency bands 100 and 200. Although the specific embodiment of FIG. 4 is configured to demodulate five contiguous channels, as will be explained further below, variable low IF receiver 300 can be modified to demodulate any number and selection of channels within frequency bands 100 and 200 without departing from the scope and spirit of the present invention.

In an embodiment, the baseband signals of channels 110a-n, contained within frequency bands 100 and 200, have been modulated using quadrature amplitude modulation (QAM). In QAM, two baseband signals commonly referred to as the I and Q components occupy the same bandwidth. These two signals can be separated using two local oscillator carriers in phase quadrature.

Tuner 400 includes two paths, in-phase path 410 and quadrature path 415 for respectively processing and separating the I and Q components of channels 110a-n. In-phase path 410 includes mixer 420, low-pass filter 422, variable gain amplifier (VGA) 424, and analog-to-digital converter (ADC) 426. Mixer 420 multiplies the received multi-channel frequency bands 100 and 200, received at input 320, by an in-phase local oscillator signal 428. In an embodiment, in-phase local oscillator signal 428 can be described by the sinusoid:

$$\cos(\omega_{lo}*t).$$

Multiplication of the received multi-channel frequency bands 100 and 200 by in-phase local oscillator signal 428 yields a bidirectional spectral shift (i.e., a shift to the left and right) by $\omega_{lo}$.

In the embodiment of FIG. 4, in-phase local oscillator signal 428 has a frequency $\omega_{lo}$ centered within a bandlimited portion of the RF input signal (i.e., frequency bands 100 and 200) containing the five contiguous channels of interest. The bandlimited portion is defined by the two outermost channels of the five contiguous channels of interest. In other words, the bandlimited portion is the narrowest bandlimited portion of the RF input signal containing the plurality of channels.

In general, local oscillator signal 428 is tunable and can have a frequency $\omega_{lo}$ centered within any bandlimited portion of the RF input signal containing any number of contiguous channels of interest.

Figure 5:
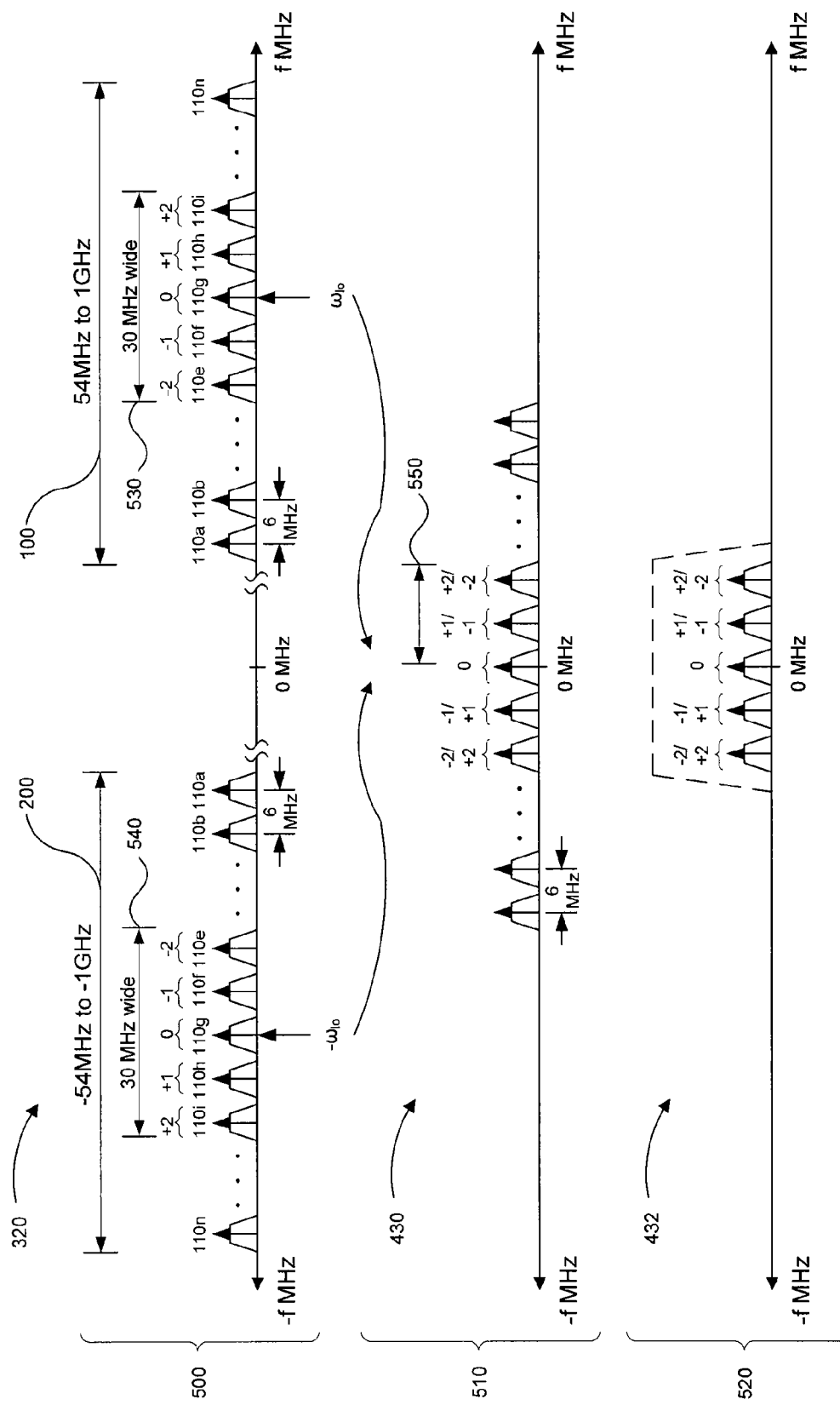
FIG. 5 illustrates the transformation of the received multi-channel RF input signal received by the variable low IF receiver of FIG. 4, according to an embodiment of the present invention.

FIG. 5 illustrates the transformation of frequency bands 100 and 200 as they are processed by in-phase path 410. Processing step 500 of FIG. 5 clearly illustrates local oscillator signal 428 in relation to frequency bands 100 and 200. As illustrated, local oscillator signal 428 has a frequency $\omega_{lo}$ centered within exemplary bandlimited portion 530, and a corresponding negative frequency $-\omega_{lo}$ centered within exemplary bandlimited portion 540. The five contiguous channels of interest 110e, 110f, 110g, 110h, and 110i are present in both bandlimited portions 530 and 540 and are further labeled in FIG. 5 as channels −2, −1, 0, +1, and +2, respectively. It is important to note that bandlimited portion 540 represents the mirror image of bandlimited portion 530.

After mixing local oscillator signal 428 with frequency bands 100 and 200, their signal spectrums are shifted to the left and right by $\omega_{lo}$. Processing step 510 of FIG. 5 illustrates the resulting in-phase mixed signal 430 at and around baseband (higher frequency portions of the resulting signal are not shown). As illustrated in processing step 510, the bandlimited portions 530 and 540 of frequency bands 100 and 200, containing the five contiguous channels of interest labeled −2, −1, 0, +1, +2, are centered and overlap at baseband. As a result, channel 0 and the mirror image of channel 0 are centered at baseband, channels +1 and −1 overlap at an IF 6 MHz above channel 0, and channels +2 and −2 overlap at an IF 12 MHz above channel 0. The resulting in-phase mixed signal 430 now contains the five channels of interest (i.e., 110e, 110f, 110g, 110h, and 110i) within half the bandwidth. That is, before mixing, channels 110e, 110f, 110g, 110h, and 110i occupied a contiguous 30 MHz bandwidth 530 centered at a frequency $\omega_{lo}$. After mixing, the resulting in-phase mixed signal 430 contains channels 110e, 110f, 110g, 110h, and 110i within a 15 MHz bandwidth 550, albeit with overlapping channel spectrums.

Referring back to FIG. 4, after mixing frequency bands 100 and 200 with local oscillator signal 428, the resulting in-phase mixed signal 430, as shown in processing step 510 of FIG. 5, is processed by low-pass filter 422 to remove unwanted channels. Low-pass filter 422 has an approximate bandwidth substantially equal to at least one half the bandwidth of bandlimited portion 530 containing the five channels of interest (i.e., 110e, 110f, 110g, 110h, and 110i). In the specific embodiment of FIG. 4, low-pass filter 422 has a bandwidth of 15 MHz. In-phase low-pass filtered signal 432 is shown in processing step 520 of FIG. 5.

In general, the frequency of in-phase local oscillator signal 428 and the bandwidth of low-pass filter 422 can be tuned/adjusted to allow any number and selection of channels 110a-n to be demodulated. For example, setting in-phase local oscillator signal 428 to a frequency centered within the entire downstream frequency band 100, and adjusting the bandwidth of low-pass filter 422 to at least half the bandwidth of frequency band 100, allows every channel 110a-n within frequency band 100 to be demodulated. In yet another example, assuming only channels 110f, 110h, and 110i are desired, local oscillator signal 428 can be adjusted to have a frequency centered between the two outermost channels (i.e., channels 110f and 110i), and the bandwidth of low-pass filter 422 can be adjusted to have a bandwidth greater than or equal to the bandwidth of the narrowest bandlimited portion containing the three channels. In this specific example, low-pass filter 422 should be adjusted to have a bandwidth greater than or equal to 24 MHz.

In general, the local oscillator signal 428 should be adjusted to have a frequency substantially centered between the two outermost channels to be demodulated. In addition, the bandwidth of low-pass filter 422 should be adjusted to have a bandwidth greater than or equal to the bandwidth of the narrowest bandlimited portion containing the channels to be demodulated.

In an embodiment, the bandwidth of low-pass filter 422 is dynamically adjusted based on the channels to be demodulated to conserve power. In general, the larger the bandwidth of low-pass filter 422, the larger the associated power requirement. By dynamically adjusting the bandwidth of low-pass filter 422 based on the channels to be demodulated, the power requirement of low-pass filter 422 can be reduced or minimized. In an embodiment, the bandwidth of low-pass filter 422 is dynamically adjusted to a substantially minimum bandwidth required by a current set of channels to be demodulated.

Although the bandwidth of low-pass filter 422 can be dynamically adjusted as described above, a decrease in the bandwidth of low-pass filter 422 can lead to a decrease in the signal-to-noise ratio (SNR) of the signal resulting from being processed by low-pass filter 422. In order to compensate for this reduction in SNR, the gain of mixer 420 can be further adjusted. Specifically, the gain of mixer 420 can be increased as the bandwidth of 422 decreases and vice-versa. In an embodiment, the gain of mixer 420 can be dynamically adjusted to have a gain proportional to $1/\sqrt{BW}$, where BW is the bandwidth of low-pass filter 422.

Referring back to FIG. 4, in-phase low-pass filtered signal 432 is subsequently processed by variable gain amplifier (VGA) 424 that functions to provide automatic gain based on a control signal from image canceller 405. VGA 424 amplifies and/or attenuates in-phase low-pass filtered signal 432 to produce an in-phase magnitude corrected signal 434. In general, VGA 424 can be used within an automatic gain control (AGC) loop to correct a magnitude imbalance between signals in in-phase path 410 and quadrature path 415. In an exemplary embodiment, VGA 424 is optional; in-phase low-pass filtered signal 432 can be directly used as input to ADC 426.

ADC 426 converts in-phase magnitude corrected signal 434 from an analog signal to a corresponding in-phase digital signal 436. In-phase digital signal 436 represents a digitized down-converted version of the in-phase or I component of the five contiguous channels of interest contained within received frequency bands 100 and 200. The embodiment of variable low IF receiver 300 advantageously requires ADC 426 to have a bandwidth and/or sampling frequency of half that of typical receiver designs. Since the five channels of interest have been down-converted by mixer 420 such that their spectrums overlap as shown in processing steps 510 and 520 of FIG. 5, the same five channels of interest occupy around half the bandwidth compared to the pre-mixed signal. In general, the sampling frequency and, correspondingly, the bandwidth of ADC 426 can be adjusted based on the current set of channels to be demodulated in the same manner as low-pass filter 422.

In an embodiment, the sampling frequency of ADC 426 is dynamically adjusted based on the channels to be demodulated to conserve power. In general, the higher the sampling frequency of ADC 426, the larger the associated power requirement. By dynamically adjusting the sampling frequency of ADC 426 based on the channels to be demodulated, the power requirement of ADC 426 can be reduced or minimized. In an embodiment, the sampling frequency of ADC 426 is dynamically adjusted to a substantially minimum sampling frequency required by a current set of channels to be demodulated.

In an embodiment, quadrature path 415 processes frequency bands 100 and 200 in substantially the same manner as in-phase path 410 and contains substantially similar components as in-phase path 410. For example, the exemplary embodiment of quadrature path 415, illustrated in FIG. 4, includes mixer 438, low-pass filter 440, VGA 442, and ADC 444. However, a notable difference between in-phase path 410 and quadrature path 415 does exist. Although quadrature local oscillator signal 446 has a frequency $\omega_{lo}$ equal to the frequency of in-phase local oscillator signal 428, quadrature local oscillator signal 446 is substantially ninety degrees out-of-phase relative to in-phase local oscillator signal 428. In an embodiment, quadrature local oscillator signal 446 can be described by the sinusoid:

$$\sin(\omega_{lo}*t).$$

Multiplication of the received multi-channel frequency bands 100 and 200 by in-phase local oscillator signal 446 yields a bidirectional spectral shift (i.e., a shift to the left and right) by $\omega_{lo}$.

In a further embodiment, processing steps 500, 510, and 520 of FIG. 5 are substantially similar to the processing steps of quadrature path 415. However, because quadrature local oscillator signal 446 is substantially ninety degrees out-of-phase relative to in-phase local oscillator signal 428, band-limited portion 530 after being mixed with quadrature local-oscillator signal 446 is similarly ninety degrees out-of-phase.

In general, frequency bands 100 and 200 are multiplied by mixer 438 with quadrature local oscillator signal 446 to produce quadrature mixed signal 448. Quadrature mixed signal 448 is processed by low-pass filter 440, having a bandwidth of 15 MHz, to produce quadrature low-pass filtered signal 450. Finally, ADC 444 converts quadrature magnitude corrected signal 452 from an analog signal to a corresponding quadrature digital signal 454.

Image canceller 405 receives and processes in-phase digital signal 436 and quadrature digital signal 454. As noted above, the five contiguous channels of interest labeled −2, −1, 0, +1, +2 in FIG. 5, are centered and overlap at baseband. Specifically, channel 0 and the mirror image of channel 0 are centered and occupy the same bandwidth at baseband, channels +1 and −1 occupy the same bandwidth at an IF 6 MHz above channel 0, and channels +2 and −2 occupy the same bandwidth at an IF 12 MHz above channel 0. In typical low IF receivers, only one of the channels occupying the same bandwidth is of interest: either LO+IF or LO−IF, where LO is the local oscillator frequency. If the desired channel is LO+IF, the LO−IF channel is suppressed. Alternatively, if the desired channel is LO−IF, the LO+IF channel is suppressed.

In contrast to typical low IF receivers, the embodiment of variable low IF receiver 300 utilizes each of the two channels occupying the same bandwidth. In the embodiments of FIG. 4 and FIG. 5, each of the two channels occupying the same bandwidth within in-phase signal 436 and quadrature signal 454 is down-converted and demodulated. That is, in the embodiments of FIG. 4 and FIG. 5 there are no true images; all signals are desired. This is illustrated by the five demodulated channels 110e, 110f, 110g, 110h, and 110i (corresponding to channels −2, −1, 0, +1, +2) represented at outputs 310e, 310f, 310g, 310h, and 310i of image canceller 405, respectively. Although the embodiments of FIG. 4 and FIG. 5 illustrate that each channel 110e, 110f, 110g, 110h, and 110i is demodulated, it should be noted that any number of these channels may be desired and therefore downconverted. For example, in an embodiment only channels 110e, 110h, and 110i are demodulated.

A typical low IF receiver rejects the image in the analog domain and the receiver has a single real output. In the embodiment of FIG. 4, image canceller 405 utilizes digital signals, in-phase digital signal 436 and quadrature digital signal 454, in the cancellation and recovery of overlapping channels and their corresponding images. In-phase digital signal 436 can be used as a reference to cancel one of two overlapping channels in the quadrature digital signal 454. Similarly, quadrature digital signal 454 can be used as a reference to cancel one of two overlapping channels in the in-phase digital signal 436. For example, channels +2 and −2 occupy the same bandwidth in both in-phase digital signal 436 and quadrature digital signal 454. In-phase digital signal 436 can be used as a reference to recover both channels +2 and −2 in quadrature digital signal 454. Quadrature digital signal 454 can further be used as a reference to recover both channels +2 and −2 in in-phase digital signal 436. In general, since image rejection is performed in the digital domain, both channels can be recovered and demodulated. This same technique can be used to recover all overlapping channels. It should be noted that recovery is the process of substantially eliminating all but a particular channel, such that the particular channel can be demodulated.

An exemplary implementation for image canceller 405 is further described in U.S. patent application Ser. No. 11/878,224, filed Jul. 23, 2007, entitled "Asymmetric Multi-Channel Adaptive Equalizer," which is incorporated herein by reference in its entirety.

3. Dual-Tuner Receiver for Multi-Channel Applications

Figure 6:
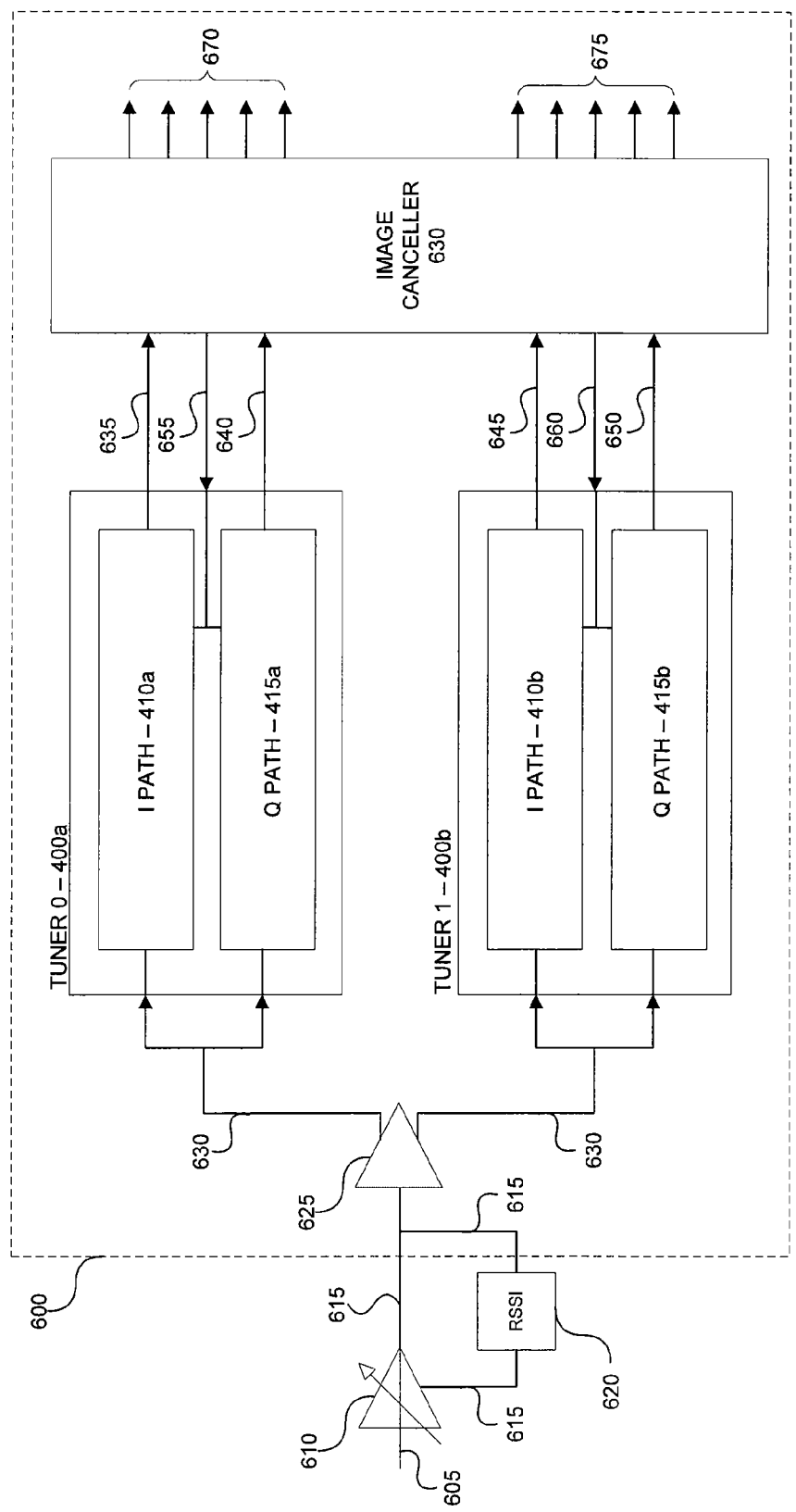
FIG. 6 illustrates an exemplary embodiment of a multi-tuner receiver architecture, according to an embodiment of the present invention.

FIG. 6 illustrates an exemplary embodiment of a multi-tuner receiver architecture 600, according to an embodiment of the present invention. As illustrated, multi-tuner receiver architecture 600 has two variable low IF tuners 400*a* and 400*b*. Each variable low IF tuner 400 has been presented in FIG. 4 and described further by FIG. 5 above. It will be apparent to one of ordinary skill in the art that multi-tuner receiver architecture 600 can include any number of tuners 400.

In an embodiment, multi-tuner receiver architecture 600 is implemented on a single silicon-substrate. A low-noise amplifier (LNA) 610 can reside off-chip as illustrated in FIG. 6 to improve the signal level and noise suppression of received RF input signal 605 containing frequency bands 100 and 200. However, in other embodiments LNA 610 can be further integrated in the same silicon-substrate as multi-tuner receiver architecture 600. LNA 610 provides a compensated RF input signal 615 to multi-tuner receiver architecture 600 and received-signal strength-indication (RSSI) module 620. RSSI module 620 can be used to ensure that compensated RF input signal 615 is maintained at a constant power level.

An internal splitter 625 receives compensated RF input signal 615 containing frequency bands 100 and 200 and drives tuners 400*a* and 400*b*, which can be tuned to two different bandlimited portions (e.g., 30 MHz bands) containing multiple contiguous channels of interest. Each tuner 400*a* and 400*b* has an I path 410*a* and 410*b*, and a Q path 415*a* and 415*b*, respectively. Tuner 400*a* provides an in-phase digital signal 635 and a quadrature digital signal 640 to image canceller 630. Tuner 400*b* similarly provides an in-phase digital signal 645 and quadrature digital signal 650 to image canceller 630. As noted above in regard to FIG. 4, image canceller 630 can recover overlapping channels contained within in-phase digital signals 635 and 645 and quadrature digital signals 640 and 650. Demodulated signals of interest are provided at outputs 670 and 675 of image canceller 630.

Advantageously, the exemplary dual tuner embodiment of FIG. 6 can tune to two separate bandlimited portions (e.g., 30 MHz bands) containing multiple contiguous channels of interest. Each bandlimited portion can be completely separate, allowing for more flexibility in channel allocation. In general, any number of tuners 400 can be utilized, depending on the number of separate bandlimited portions an application tunes to.

Figure 7:
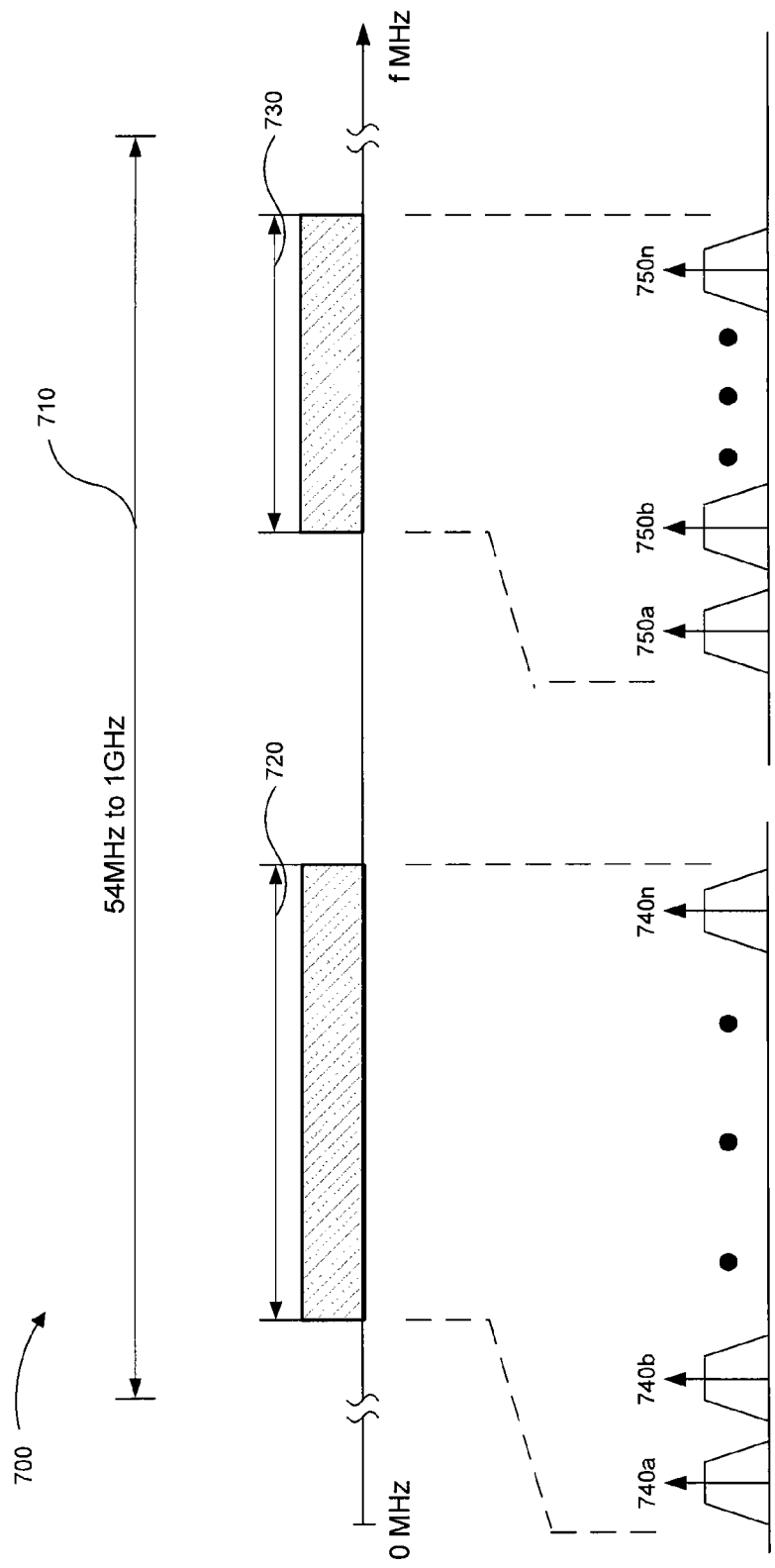
FIG. 7 illustrates an exemplary embodiment of two separate bandlimited portions containing contiguous channels of interest that the multi-tuner receiver architecture of FIG. 6 can tune to, according to an embodiment of the present invention.

FIG. 7 illustrates an exemplary embodiment of two, separate bandlimited portions that the multi-tuner receiver architecture 600 can tune to, according to an embodiment of the present invention. In exemplary illustration 700, the two bandlimited portions 720 and 730 are contained within the 54 Mhz to 1 GHz spectrum 710, however they are separated in the frequency domain by a given amount of spectrum. Moreover, as further illustrated by FIG. 7, each bandlimited portion can have any number of contiguous channels contained therein. Bandlimited portion 710 has contiguous channels 740*a*-740*n* contained therein, while bandlimited portion 730 has contiguous channels 750*a*-750*n* contained therein.

Figure 8:
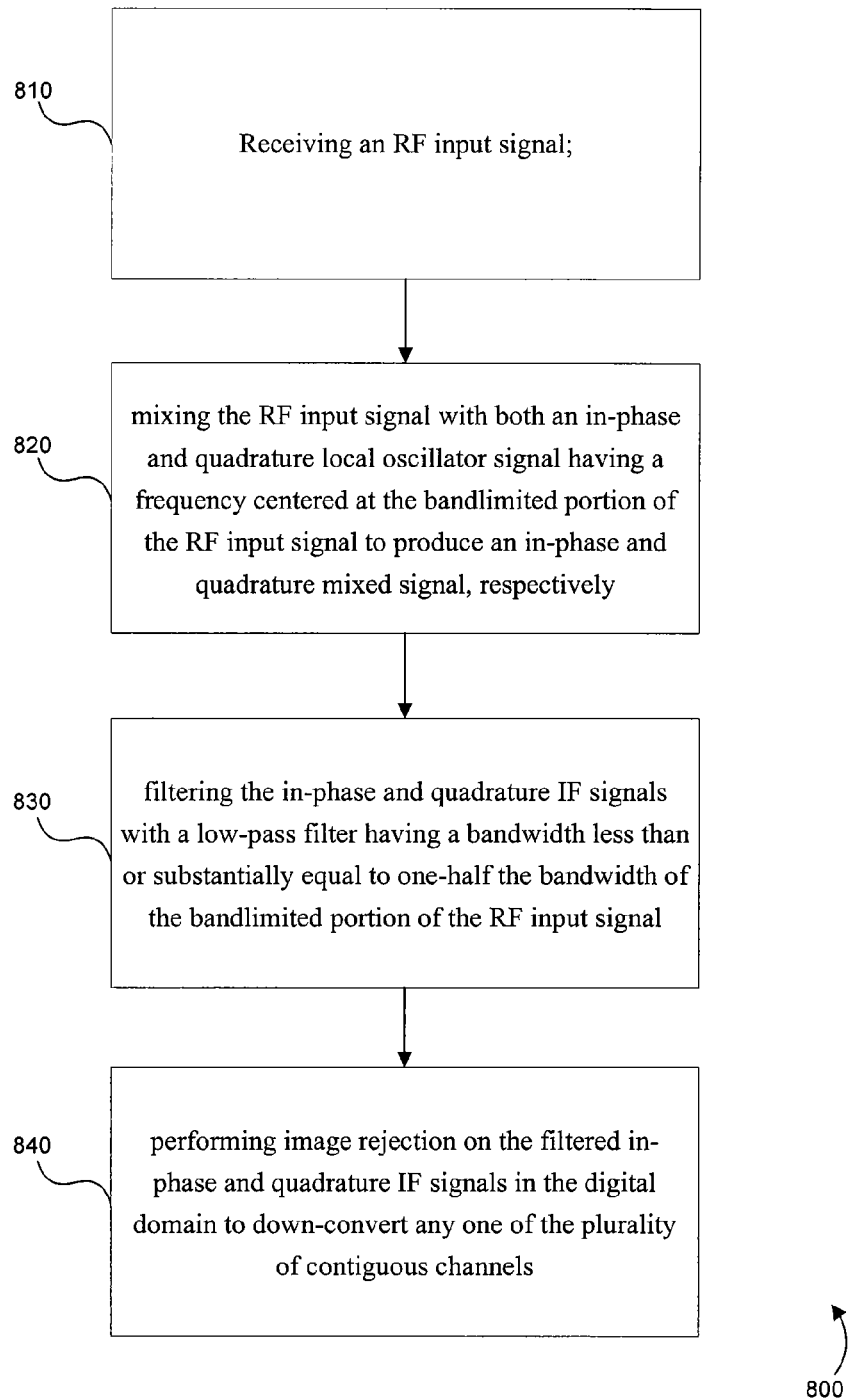
FIG. 8 illustrates an exemplary flowchart of a method to down-convert any number of channels within a received multi-channel RF input signal, according to an embodiment of the present invention.

FIG. 8 illustrates a flowchart 800 of a method for down-converting a plurality of contiguous channels within a received multi-channel RF input signal, according to an embodiment of the present invention. Flowchart 800 begins at step 810 with the reception of a multi-channel RF input signal.

After receiving a multi-channel RF input signal, flowchart 800 proceeds to step 820. At step 820, the multi-channel RF input signal is mixed with both an in-phase and a quadrature local oscillator signal. Each local oscillator signal is adjusted to have a frequency centered within a bandlimited portion of the received multi-channel RF input signal containing a plurality of contiguous channels of interest. The mixing performed at step 820 produces two mixed signals: an in-phase mixed signal and a quadrature mixed signal.

After step 820, flow chart 800 proceeds to step 830. At step 830 the in-phase and quadrature mixed signals are filtered by a low-pass filter having a bandwidth greater than or substantially equal to one-half the bandwidth of the bandlimited portion of the RF input signal. Filtering removes unwanted channels that are adjacent to or near the desired channels.

After filtering at step 830, flowchart 800 proceeds to final step 840 where image rejection is performed on the filtered in-phase and quadrature signals in the digital domain.

4. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for demodulating a plurality of channels among a group of contiguous channels in a radio-frequency (RF) input signal, comprising:

receiving the RF input signal comprising the group of contiguous channels and a mirror image of the group of contiguous channels;

mixing the RF input signal with an in-phase local oscillator signal to produce a mixed in-phase signal and with a quadrature local oscillator signal to produce a mixed quadrature signal, wherein the group of contiguous channels and the mirror image of the group of contiguous channels are centered at baseband within the mixed in-phase signal and within the mixed quadrature signal;

performing image rejection on the mixed in-phase and quadrature signals in the digital domain to recover the plurality of channels, wherein a first one of the plurality of channels originates from the group of contiguous channels and a second one of the plurality of channels originates from the mirror image of the group of contiguous channels, and wherein the step of performing comprises:

recovering a first one of the plurality of channels by using the mixed in-phase signal as a reference to reject the second one of the plurality of channels in the mixed quadrature signal and using the mixed quadrature signal as a reference to reject the second one of the plurality of channels in the mixed in-phase signal; and recovering a second one of the plurality of channels by the using the mixed in-phase signal as a reference to reject the first one of the plurality of channels in the mixed quadrature signal and using the mixed quadrature signal as a reference to reject the first one of the plurality of channels in the mixed in-phase signal.

2. The method of claim 1, wherein the group of contiguous channels is defined by the two outermost channels of the plurality of channels.

3. The method of claim 1, wherein the group of contiguous channels occupies the narrowest portion of the RF input signal containing the plurality of channels.

4. The method of claim 1, further comprising:
before performing image rejection, filtering the mixed in-phase and quadrature signals with a low-pass filter having a bandwidth substantially equal to one-half the bandwidth of the group of contiguous channels.

5. The method of claim 1, further comprising:
dynamically adjusting a bandwidth of a low-pass filter, used to filter the mixed in-phase and quadrature signals, based on the group of contiguous channels.

6. The method of claim 5, wherein the bandwidth of the low-pass filter is configured to be dynamically adjusted to reduce a power requirement of the low-pass filter.

7. The method of claim 1, wherein the in-phase and quadrature local oscillator signals are substantially ninety degrees out of phase.

8. The method of claim 1, wherein each channel among the group of contiguous channels is in the plurality of channels.

9. A variable low intermediate-frequency (IF) receiver for demodulating a plurality of channels among a group of contiguous channels in a radio-frequency (RF) input signal, comprising:

a tuner having an in-phase path and a quadrature path that are configured to down-convert the group of contiguous channels and a mirror image of the group of contiguous channels to provide as output a digital in-phase signal and a digital quadrature signal, respectively, wherein the group of contiguous channels and a mirror image of the group of contiguous channels are centered at baseband within the digital in-phase signal and the digital quadrature signal; and an image canceller coupled to the digital in-phase and quadrature signals, the image canceller configured to perform image rejection on the digital in-phase and quadrature signals to recover the plurality of channels, wherein a first one of the plurality of channels originates from the group of contiguous channels and a second one of the plurality of channels originates from the mirror image of the group of contiguous channels, and wherein each channel among the group of contiguous channels is in the plurality of channels.

10. The variable low IF receiver of claim 9, wherein the group of contiguous channels occupies the narrowest portion of the RF input signal containing the plurality of channels.

11. The variable low IF receiver of claim 9, wherein the in-phase path comprises:
a mixer configured to multiply the RF input signal with a local oscillator signal to provide as output a mixed in-phase signal.

12. The variable low IF receiver of claim 11, wherein the in-phase path further comprises:
a low-pass filter having a bandwidth substantially equal to one-half the bandwidth of the group of contiguous channels, the low-pass filter coupled to the mixed in-phase signal and configured to filter the mixed in-phase signal to provide as output a filtered in-phase signal.

13. The variable low IF receiver of claim 9, wherein the in-phase path further comprises:
a low-pass filter coupled to the mixed in-phase signal and configured to filter the mixed in-phase signal to provide as output a filtered in-phase signal, wherein a bandwidth of the low-pass filter is configured to be dynamically adjusted based on the group of contiguous channels.

14. The variable low IF receiver of claim 13, wherein the bandwidth of the low-pass filter is configured to be dynamically adjusted to reduce a power requirement of the low-pass filter.

15. The variable low IF receiver of claim 13, wherein a gain of the mixer is configured to be dynamically adjusted based on the bandwidth of the low-pass filter.

16. The variable low IF receiver of claim 13, wherein the in-phase path further comprises:
an analog-to-digital converter (ADC) coupled to the filtered in-phase signal, the ADC configured to digitize the filtered in-phase signal to provide as output the digital in-phase signal.

17. The variable low IF receiver of claim 16, wherein a sampling frequency of the ADC is determined based on a bandwidth of the group of contiguous channels.

18. The variable low IF receiver of claim 17, wherein the sampling frequency of the ADC is configured to be dynamically adjusted based on the plurality of channels.

19. The variable low IF receiver of claim 17, wherein the sampling frequency of the ADC is configured to be dynamically adjusted to reduce a power requirement of the ADC.

20. The variable low IF receiver of claim 9, wherein the quadrature path comprises:
a mixer configured to multiply the RF input signal with a local oscillator signal to provide as output a mixed quadrature signal.

21. The variable low IF receiver of claim 20, wherein the quadrature path further comprises:
a low-pass filter having a bandwidth substantially equal to one-half the bandwidth of the group of contiguous channels, the low-pass filter coupled to the mixed quadrature signal and configured to filter the mixed quadrature signal to provide as output a filtered quadrature signal.

22. The variable low IF receiver of claim 20, wherein the quadrature path further comprises:
a low-pass filter coupled to the mixed quadrature signal and configured to filter the mixed quadrature signal to provide as output a filtered quadrature signal, wherein a bandwidth of the low-pass filter is configured to be dynamically adjusted based on the group of contiguous channels.

23. The variable low IF receiver of claim 22, wherein the bandwidth of the low-pass filter is configured to be dynamically adjusted to reduce a power requirement of the low-pass filter.

24. The variable low IF receiver of claim 22, wherein a gain of the mixer is configured to be dynamically adjusted based on the bandwidth of the low-pass filter.

25. The variable low IF receiver of claim 22, wherein the quadrature path further comprises:
an analog-to-digital converter (ADC) coupled to the filtered quadrature signal, the ADC configured to digitize the filtered quadrature signal to provide as output the digital quadrature signal.

26. The variable low IF receiver of claim 25, wherein a sampling frequency of the ADC is determined based on a bandwidth of the group of contiguous channels.

27. The variable low IF receiver of claim 26, wherein the sampling frequency of the ADC is configured to be dynamically adjusted based on the plurality of channels.

28. The variable low IF receiver of claim 26, wherein the sampling frequency of the ADC is configured to be dynamically adjusted to reduce a power requirement of the ADC.

29. A variable low intermediate-frequency (IF) receiver for demodulating a plurality of channels among a group of contiguous channels in a radio-frequency (RF) input signal, comprising:
a tuner having an in-phase path and a quadrature path that are configured to down-convert the group of contiguous channels and a mirror image of the group of contiguous channels to provide as output a digital in-phase signal and a digital quadrature signal, respectively, wherein the group of contiguous channels and the mirror image of the group of contiguous channels are centered at baseband within the digital in-phase signal and the digital quadrature signal; and
an image canceller coupled to the digital in-phase and quadrature signals, the image canceller configured to perform image rejection on the digital in-phase and quadrature signals to recover the plurality of channels, wherein a first one of the plurality of channels originates from the group of contiguous channels and a second one of the plurality of channels originates from the mirror image of the group of contiguous channels, and wherein the group of contiguous channels occupies the narrowest portion of the RF input signal containing the plurality of channels.

30. A method for demodulating a plurality of channels among a group of contiguous channels in a radio-frequency (RF) input signal, comprising:
receiving the RF input signal comprising the group of contiguous channels and a mirror image of the group of contiguous channels;
mixing the RF input signal with an in-phase local oscillator signal to produce a mixed in-phase signal, wherein the group of contiguous channels and the mirror image of the group of contiguous channels are centered at baseband within the mixed in-phase signal;
mixing the RF input signal with a quadrature local oscillator to produce a mixed quadrature signal, wherein the group of contiguous channels and the mirror image of the group of contiguous channels are centered at baseband within the mixed quadrature signal;
performing image rejection on the mixed in-phase and quadrature signals in the digital domain to recover the plurality of channels, wherein a first one of the plurality of channels originates from the group of contiguous channels and a second one of the plurality of channels originates from the mirror image of the group of contiguous channels; and
before performing image rejection, filtering the mixed in-phase and quadrature signals with a low-pass filter having a bandwidth substantially equal to one-half a bandwidth of the group of contiguous channels.

\* \* \* \* \*